United States Patent

[11] 3,565,282

| [72] | Inventor | Theophiel Clement Jozef Lodewijk Staar<br>Kraainem, Belgium |
|---|---|---|
| [21] | Appl. No. | 741,465 |
| [22] | Filed | July 1, 1968 |
| [45] | Patented | Feb. 23, 1971 |
| [73] | Assignee | S.A. Staar<br>Brussels, Belgium |
| [32] | Priority | Dec. 19, 1967 |
| [33] | | Belgium |
| [31] | | 52,355 |

[54] CASSETTE STORAGE MAGAZINE
6 Claims, 9 Drawing Figs.

[52] U.S. Cl. .................................................... 221/83
[51] Int. Cl. ................................................ G07f 11/00
[50] Field of Search .......................................... 221/82, 83,
197, 86, 69, 90, 91, 93; 274/4 (F); 353/111

[56] References Cited
UNITED STATES PATENTS

| 3,146,666 | 9/1964 | Mimaca ..................... | 353/111X |
| 3,477,285 | 11/1969 | Gould et al. ................ | 353/111X |
| 571,931 | 11/1896 | Raymond et al. ........... | 221/82 |
| 2,717,606 | 9/1955 | Batzle ....................... | 221/86X |
| 3,021,050 | 2/1962 | Rogers ...................... | 221/82X |

Primary Examiner—Samuel F. Coleman
Attorney—Wolfe, Hubbard, Voit & Osann

ABSTRACT: A bottomless, removable magazine tray for loading cassettes in a player-recorder, provided with a longitudinal rod normally held by a latch along the open bottom of the tray for retaining the cassettes when the tray is removed from the player-recorder, the latch being released as an incident to placing the tray in its carriage on the player-recorder to permit the rod to be retracted for transfer of cassettes from the tray.

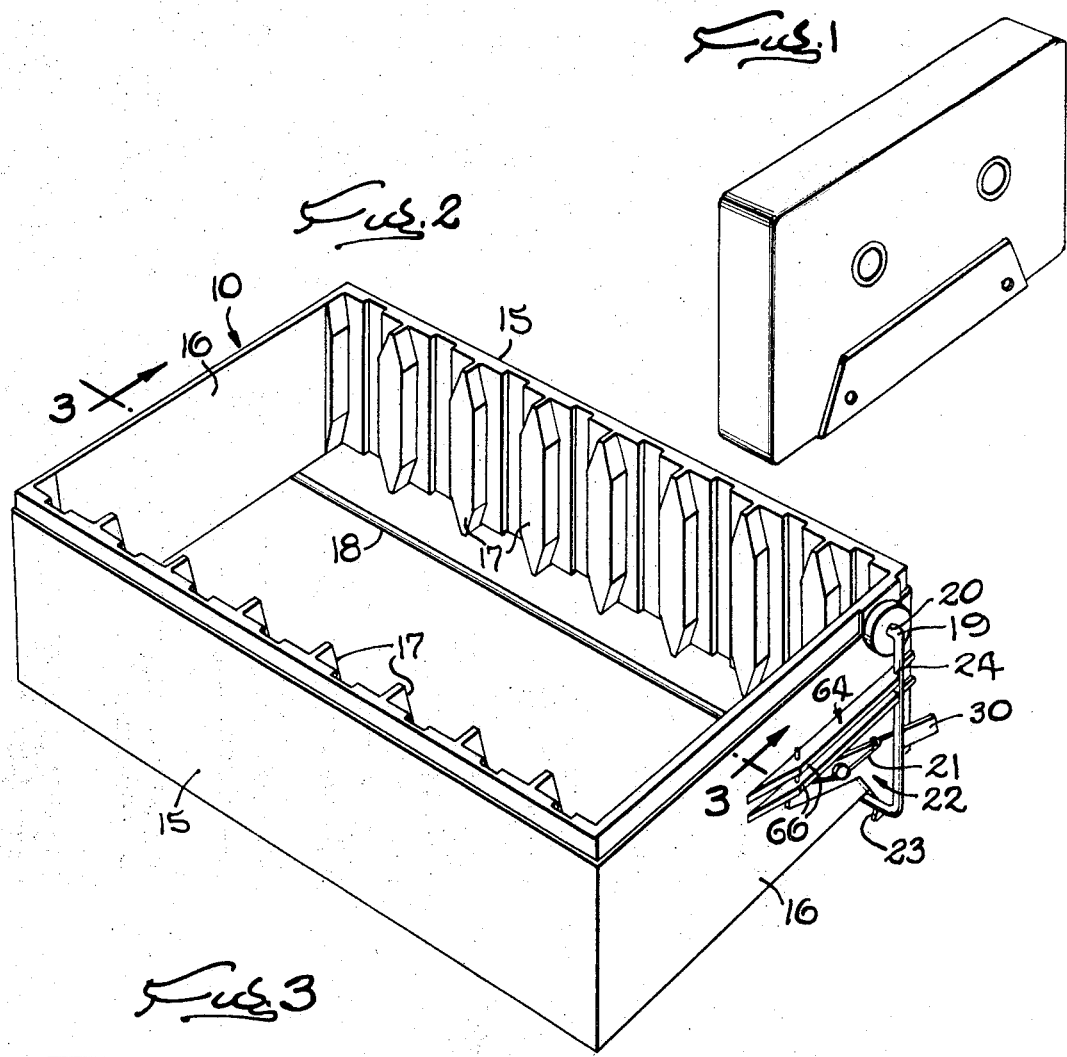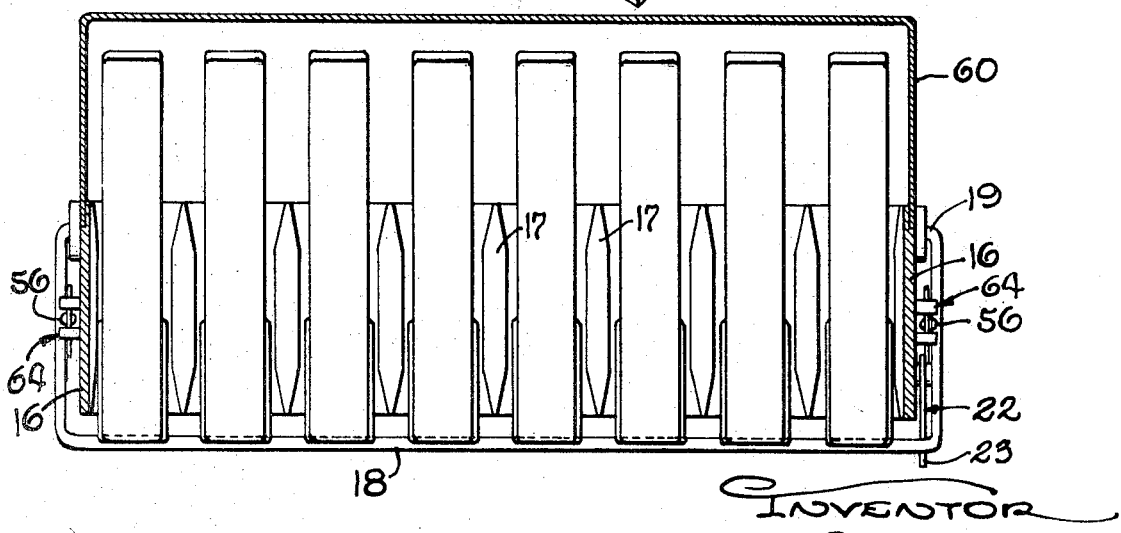

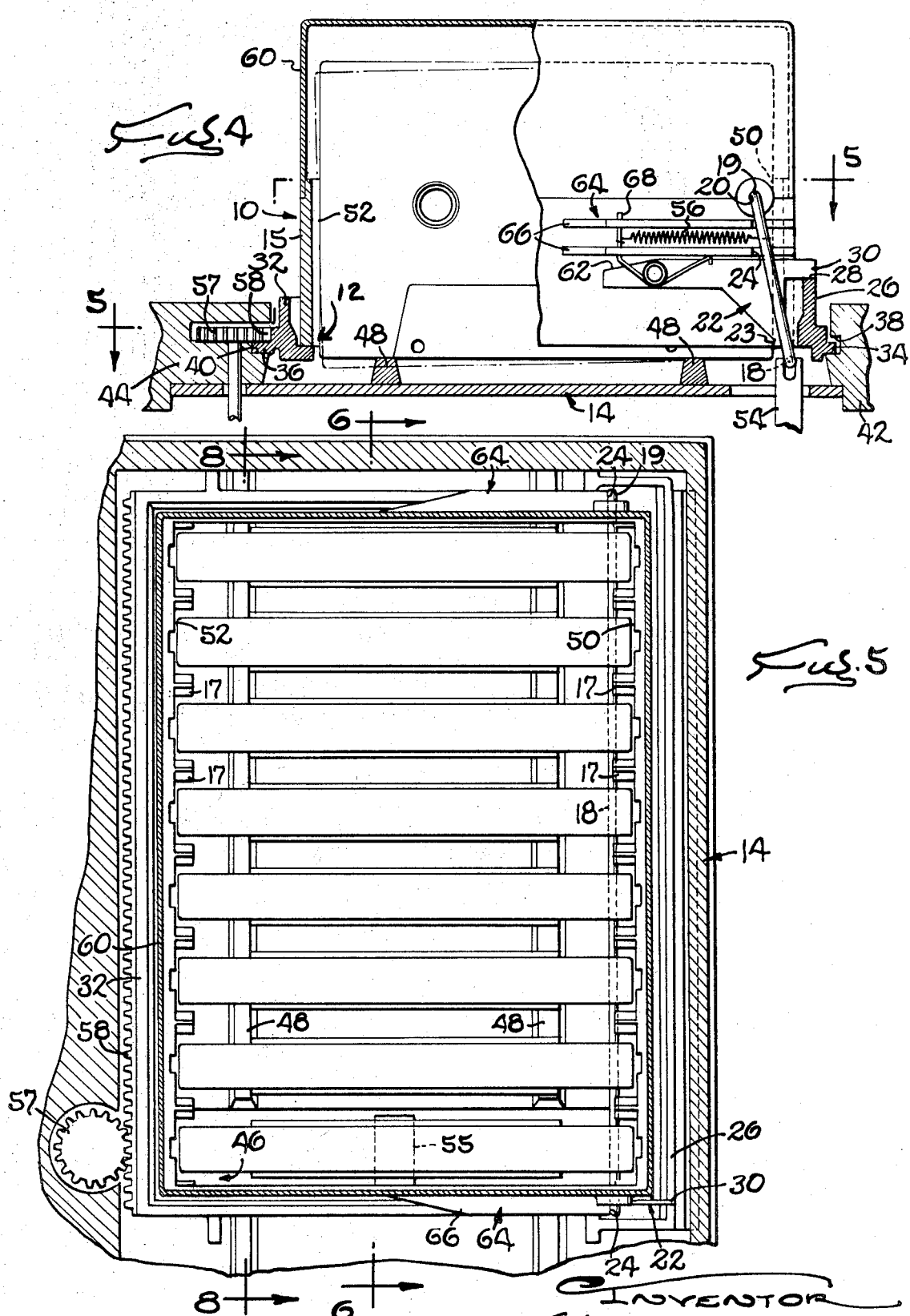

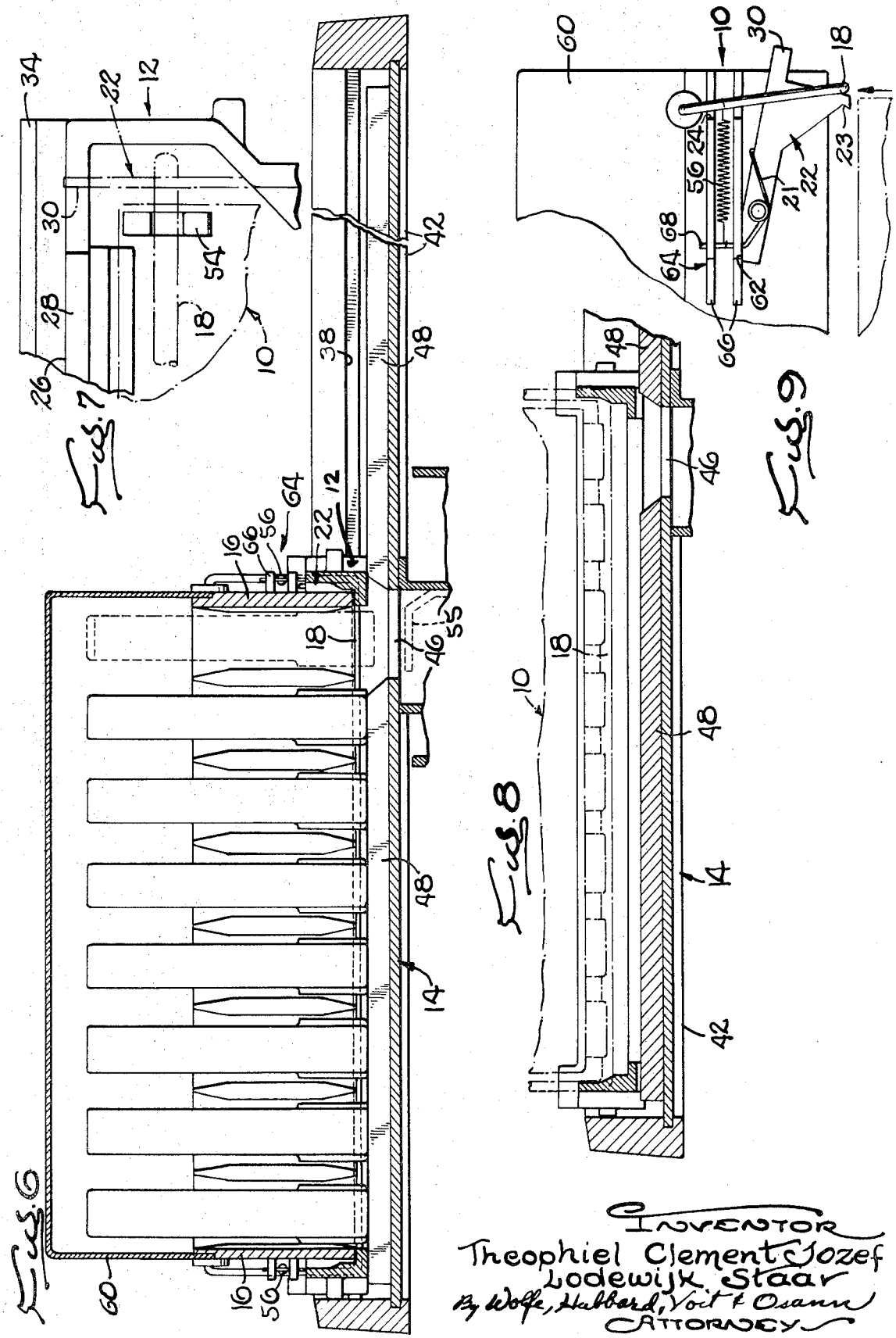

CASSETTE STORAGE MAGAZINE

DESCRIPTION OF THE INVENTION

The invention relates to means for storage of tape "cassettes" more particularly to a cassette storage magazine.

The increasing variety of recording cassettes raises a filing problem for users. Moreover, an increased need is being felt for player-recorders which can automatically play back a series of cassettes successively or selectively, such as provided by my automatic changer invention described in my copending application Ser. No. 720,236 entitled "Automatic Changer For Cassette Player-Recorder," filed Apr. 10, 1968.

It is an object of this invention to provide a cassette storage magazine enabling cassettes to be filed and stored rationally, and also useful for loading a plurality of cassettes into a player-recorder having an automatic changer for carrying cassettes between the magazine and the tape transport of the player-recorder.

It is a principal object of the invention to provide a cassette storage magazine which enables cassettes to be filed in a ready and practical manner, giving them optimum protection and yet retaining them conveniently accessible.

Another important object is to provide for storage of a large number of cassettes by using separate magazines each of which may be used to load cassettes en bloc into player-recorder apparatus equipped with a cassette changer.

Other objects and advantages of the invention will be apparent from the following description taken in connection with the accompanying drawings in which:

FIG. 1 is a perspective view of a cassette;

FIG. 2 is a perspective view of a cassette storage magazine constructed according to the invention;

FIG. 3 is a longitudinal sectional view taken in the plane of lines 3—3 in FIG. 2;

FIG. 4 is a fragmentary transverse sectional view illustrating the magazine of FIG. 1 placed in a carriage on the frame of a cassette player-recorder and with a protective cover placed on the magazine;

FIG. 5 is a fragmentary horizontal sectional view taken in the offset planes of lines 5—5 in FIG. 4;

FIG. 6 is a fragmentary longitudinal sectional view taken in the plane of lines 6—6 in FIG. 5;

FIG. 7 is a fragmentary plan view of one end of the carriage;

FIG. 8 is a fragmentary longitudinal sectional view taken in the plane of lines 8—8 in FIG. 5 but with the magazine above the carriage as though it is being inserted; and FIG. 9 is a fragmentary view of the cassette retainer latched in nonblocking position for bottom loading.

Referring to the drawings, FIGS. 2, 4 and 5 taken together illustrate a cassette storage magazine constructed in accordance with the present invention. The magazine is formed as a bottomless tray 10 for storing a plurality of cassettes. A conventional "cassette" is shown in FIG. 1 and as the term is used herein means a tape cartridge of the type in which magnetic tape is carried on two reels in a flat, thin, plastic container. The tray 10 is removable from the player-recorder and when used for loading cassettes onto the player-recorder, is adapted to be placed, as illustrated in FIGS. 4 and 6, on a horizontally movable carriage 12 which is supported by the frame 14 of the apparatus. The cassette is adapted to be carried by changer mechanism through a change cycle involving lowering the cassette to playing position in the tape transport of the player recorder, which is mounted below the magazine on the fixed frame 14, and thereafter returning the cassette to the magazine.

The cassettes are carried in the tray 10 side by side, each standing on the forward edge of the cassette as shown in FIG. 3 which edge has a plurality of openings for access to the tape, when the cassette is in the playing position, for the recording and playback heads and other operative elements. The tray is preferably rectangular and formed by sidewalls 15 and end walls 16 and is divided into transverse compartments for the cassettes by means herein shown as stubby partitionlike elements 17 which project from the sidewalls 15 of the tray.

In order to prevent the cassettes from dropping through the bottomless tray 10 when it is separated from any apparatus, a longitudinal retaining rod 18 is mounted on the under edge of the tray. For mounting the rod 18 it is bent upwards near each end and the tips 19 of the rod are bent to extend parallel to the main section of the rod and seat in sockets 20 in the end walls 16 of the tray. Cassettes loaded in the tray rest on the rod 18 as illustrated in FIG. 3. The rod is held beneath the tray by a latch arm 22 which is pivotally mounted on one end of the tray and held by a spring 21 so that a notch 23 in the forward edge of the arm latches the retaining rod and holds it against a stop 24.

One of the features of the invention is the release of the latch arm 22 as an incident to placing the magazine tray into the carriage 12 of the player-recorder apparatus, so that the retaining rod may be swiveled from beneath the tray to release cassettes for the playing operation. For this purpose one longitudinal side 26 of the carriage forms a horizontal ledge 28 which is engaged by a projection 30 from the latch arm as the tray is lowered into the carriage and serves to shift the latch arm away from the rod as an incident to placing the tray in the carriage so that the rod is free to move.

By means of the changer mechanism each cassette may be lowered into playing position by being slid in its main plane, and the player-recorder apparatus is preferably oriented such that this sliding movement of the cassette occurs vertically downwards from the magazine to the playing position. Thus the tray is preferably arranged to be horizontal on the horizontal carriage 12. For support of the tray carriage 12 for horizontal sliding movement, as shown in FIG. 4, its sides 26, 32 have tongues 34, 36 which slide in facing horizontal grooves 38, 40 provided in fixed supporting frame members 42, 44.

The magazine tray 10 and carriage 12 are thus movable to locate any one of the cassettes on the tray in operative position above an entrance slot 46 to the tape transport (FIG. 6). As shown in FIGS. 4 and 6, the horizontal frame plate 14 supports a pair of longitudinal rails 48 on which the cassettes in the magazine rest except for the single cassette in the magazine compartment above the entrance slot 46, which entrance slot is transversely located relative to the rails so as to interrupt the rails. That single cassette (dashed lines in FIGS. 4 and 6) is held from falling through the entrance slot 46 by the longitudinal retaining rod 18, the upper edge of which lies slightly below the plane of the top surface of the supporting rails 48, and beneath the cassette. The rod 18 is adjacent one end of the slot so that the cassette starts to fall into the slot when it is brought into operative position above the slot and is held by the rod in such a manner that it tilts away from the adjacent sidewall 50 (FIG. 4) of the tray 10 and into leaning engagement with the opposite sidewall 52 of the tray (as shown in dashed lines in FIG. 4) to insure that upon retraction of the rod 18 the cassette will not stick to the walls of the magazine and will readily drop through the entrance slot toward the tape transport. The rod 18 is moved in swiveling retraction and return motion by means of an arm 54 which is actuated by the changer mechanism to release the single cassette in the compartment disposed above the transverse entrance slot 46 to drop by gravity through the slot for lowering to the playing position by means such as an elevator arm 55.

After the playing operation, the cassette is carried upward to the magazine tray 10 by the elevator arm 55. The retaining rod 18 is returned by a spring 56 to the position of FIG. 5 to retain the cassettes in the magazine, the actuator arm 54 of the changer mechanism pivoting back to allow the return of the rod. As another feature of the changer mechanism, means is provided to shift the magazine tray 10 after one cassette has been returned to locate the next compartment and its cassette over the entrance slot 46, said means being herein shown as a gear 57 meshing in a rack 58 along the side of the carriage 12, the gear being driven by the changer mechanism.

In order to protect the cassettes, a boxlike cover 60 of material such as stiff transparent plastic is removably received by the upper edges of the walls of the magazine tray 10. It will be seen that the cover 60 may be left on the tray 10 after it has been removed from the apparatus so as to protect the cassettes from dust and damage while being stored in the tray, it being contemplated that a plurality of trays may be used for storing and filing cassettes, each tray providing means for loading the cassettes en bloc into player-recorder apparatus having provision for receiving cassettes from the tray as, for example, provided by an automatic changer mechanism.

Cassettes may be loaded in the tray from the top by removing the cover 60, or from the bottom without removing the cover 60 by swinging the retaining rod 18 to one side of the tray as shown in FIG. 9 and holding or latching the rod in this nonblocking position by means of the back edge of the latch arm 22. The latch arm is biased to its latching position (FIGS. 1, 9) by the spring 21 which is coiled around the pivot for the arm, and fixed at one end to an abutment 64 and hooked at the other end over the edge of the arm. In the bottom loading position of the latch arm 22, it is pivoted clockwise by the spring 21 until a beveled surface 62 on the edge of the arm adjacent the abutment 64 bears against the under edge thereof. The abutment 64 is formed by two small projecting tongues 66 interconnected by a pin 68 to which the rod spring 56 is fixed which is attached to and tends to pull the rod 18 under the tray and against its stop 24. The projection 30 extending from the back edge of the latch arm 22 provides for convenient movement of the arm manually about its pivot, as well as an incident to lowering the tray into the carriage, to permit the rod to be swung past the arm so that it may return against the back edge of the arm to be held in its nonblocking position.

I claim:

1. In a player-recorder for cassettes, a fixed frame, a carriage on said frame, a bottomless tray removably received by said carriage for storage of a plurality of cassettes each adapted to be played in said player-recorder, retractable cassette-retaining means carried by the tray, a normally engaged latch holding said retaining means along the open bottom of said tray to hold the cassettes in said tray, and means for releasing said latch as an incident to placing said tray in said carriage to permit retraction of said retaining means and transfer of cassettes from said tray.

2. A cassette storage tray according to claim 1, having a cover removably received on the top of said tray.

3. A boxlike bottomless tray for storage of a plurality of cassettes, a retractable retainer carried to block the opening in the bottom of said tray, and means for latching said retainer selectively either in a blocking position in said opening for retaining cassettes in the tray, or in a nonblocking position relative to said opening for loading cassettes in the tray from the bottom.

4. A tray for storage of a plurality of cassettes according to claim 3, in which said retainer comprises a retaining rod extending longitudinally of the tray, and in which said latching means comprises an arm pivotally mounted on one end of said tray and spring urged around its pivot to hold said rod across the bottom opening in its blocking position against a stop on said tray or against an abutment on said tray to hold said rod adjacent one side of said tray in its nonblocking position.

5. An elongated bottomless tray for storage of a plurality of cassettes, a retractable longitudinal rod along the open bottom of said tray and having arms seated in the end walls of said tray, a normally engaged latch holding said rod spaced inward from one sidewall of said try to hold the cassettes from falling through the open bottom of said tray, and partition elements projecting from the sidewalls inward and dividing the tray into transverse compartments so that the cassettes stand side by side in said compartments and rest on edge on said rod.

6. An elongated, boxlike tray for storage of a plurality of cassettes, said tray having an opening in the bottom for passage of cassettes, retractable cassette retaining means carried in said opening so that the cassettes rest on edge and stand side by side on said retaining means blocked from falling through the bottom opening, and a releasable latch carried by said tray for latching said cassette retaining means in blocking position, said releasable latch also being engagable with said retainer to hold said retainer in a nonblocking position adjacent one side of said tray for bottom loading of said tray.